Nov. 7, 1950 F. M. HOGUE 2,529,393
FLUID CONTROL MEANS FOR AUXILIARY TRANSMISSIONS
Filed Sept. 28, 1946 4 Sheets-Sheet 1
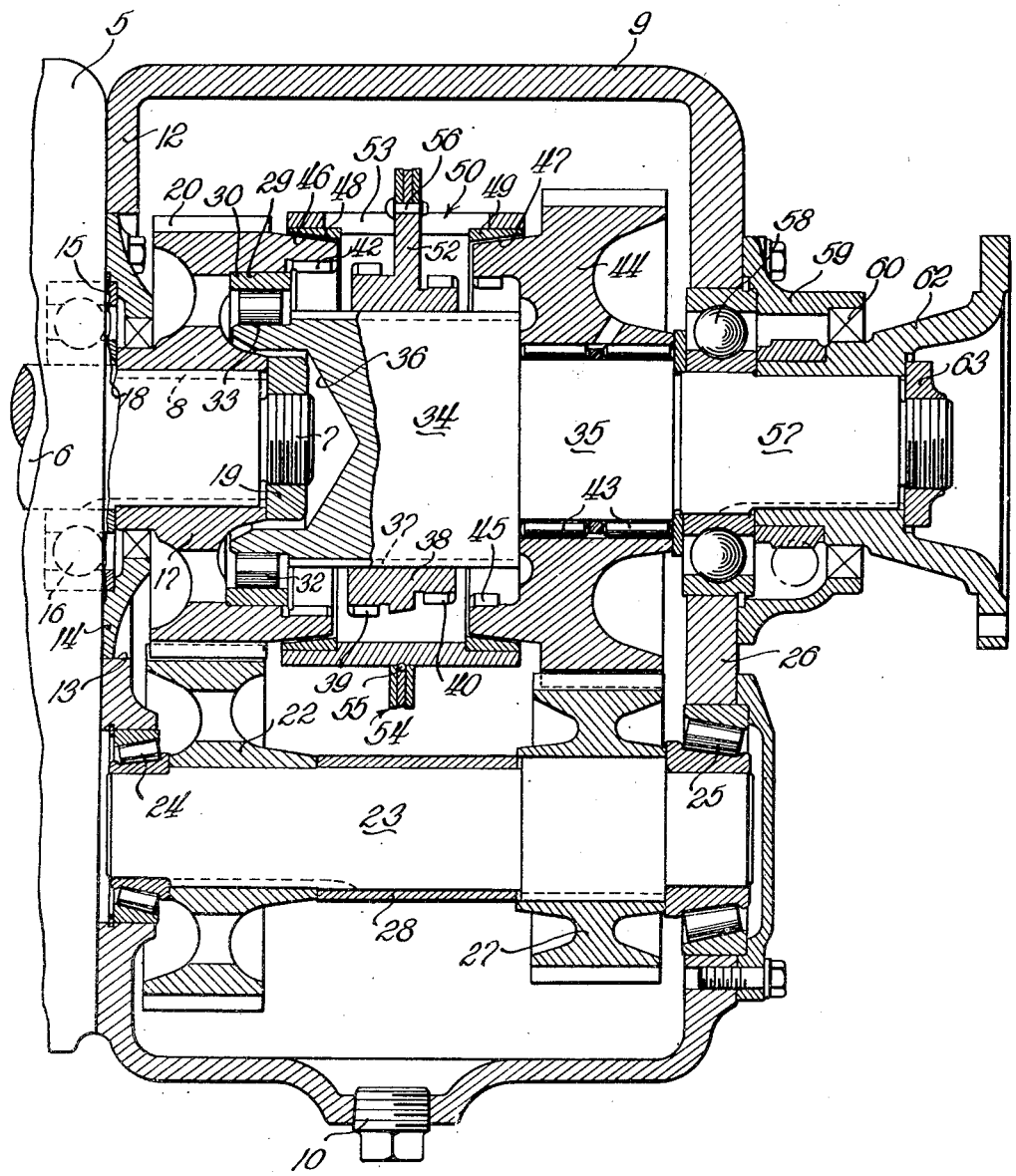
INVENTOR.
F. Marion Hogue
BY Walter E. Schirmer
Atty.

Nov. 7, 1950 F. M. HOGUE 2,529,393
FLUID CONTROL MEANS FOR AUXILIARY TRANSMISSIONS
Filed Sept. 28, 1946 4 Sheets-Sheet 2
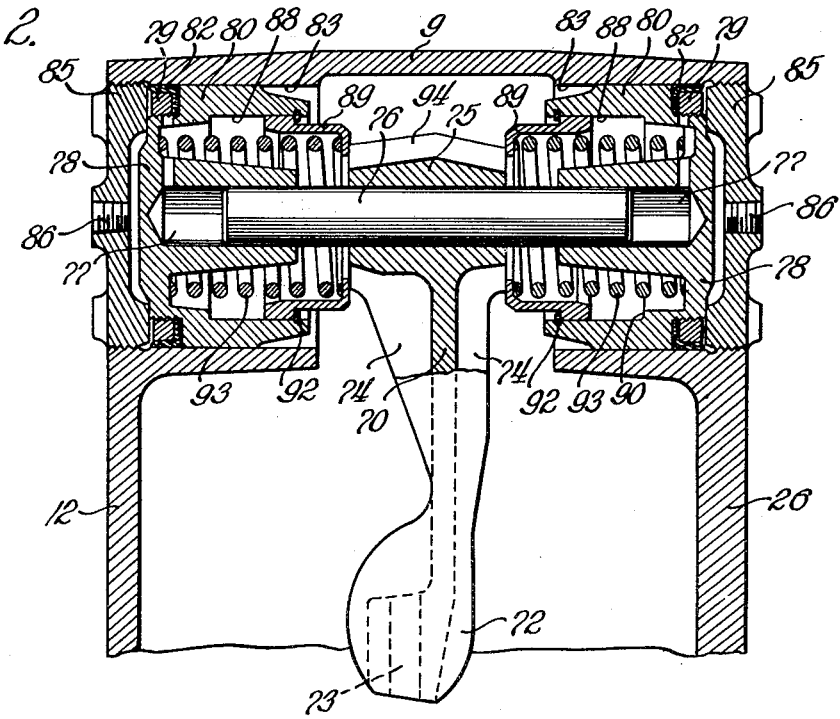
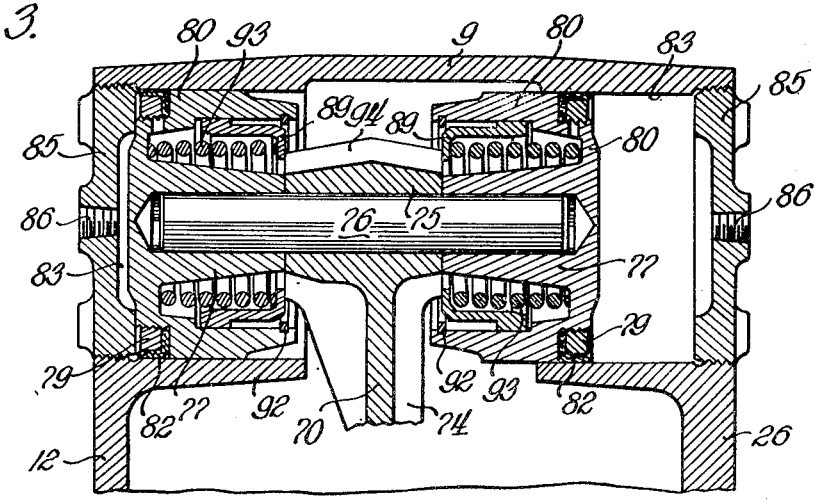
INVENTOR.
F. Marion Hogue

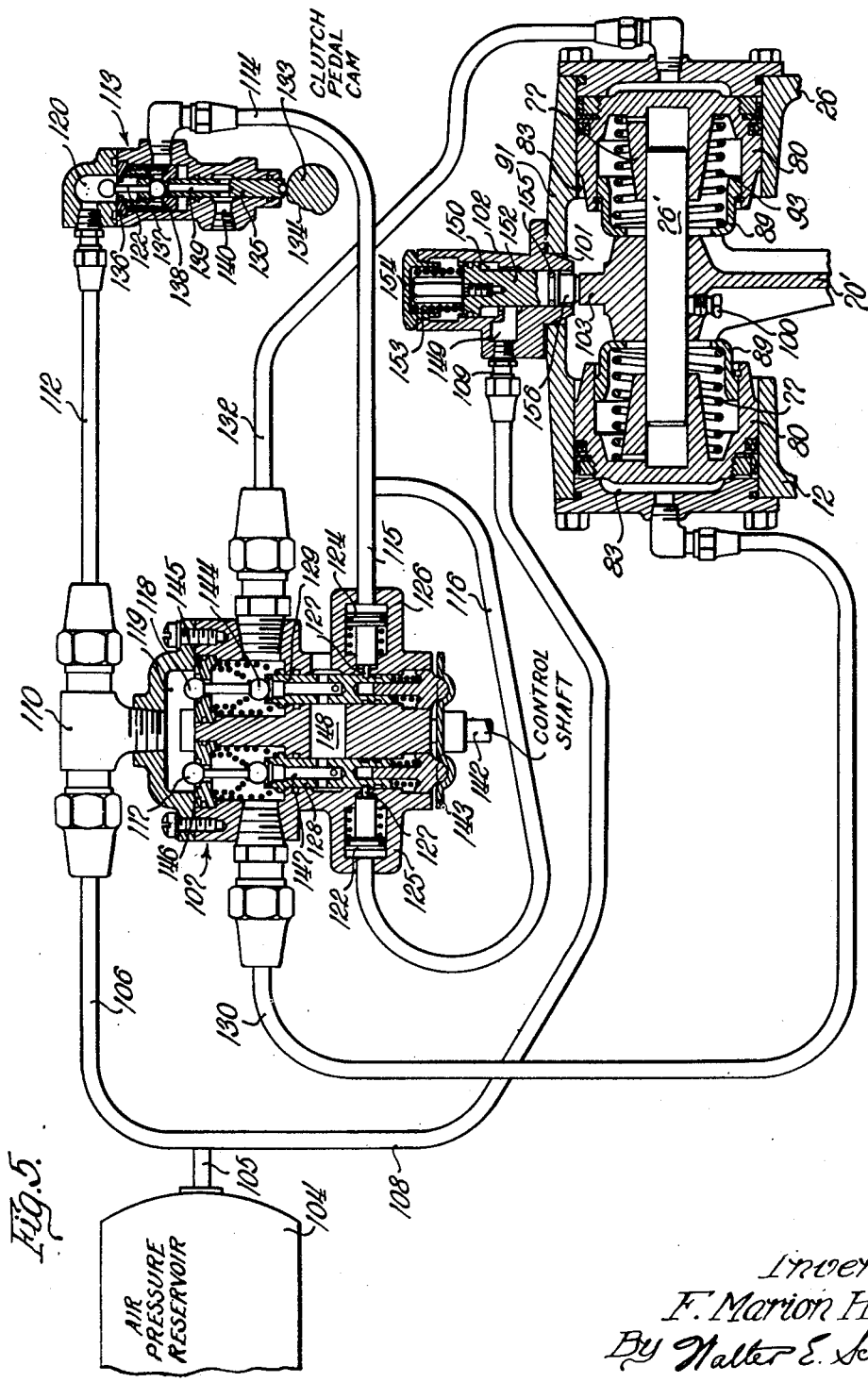

Patented Nov. 7, 1950

2,529,393

UNITED STATES PATENT OFFICE 2,529,393

FLUID CONTROL MEANS FOR AUXILIARY TRANSMISSIONS

Francis Marion Hogue, Berrien Springs, Mich., assignor to Clark Equipment Company, Buchanan, Mich., a corporation of Michigan Application September 28, 1946, Serial No. 700,068

3 Claims. (Cl. 74—334)

This invention is concerned primarily with the provision of an auxiliary transmission for attachment to a standard automotive type transmission and control means for such auxiliary transmission.

Broadly stated, the present invention is directed to a two speed auxiliary transmission which is so designed that it can be attached directly to the rear end wall of a standard type transmission without requiring changing of any of the parts of the standard transmission, and which provides an output shaft in line with the normal output shaft of the standard transmission and equipped to receive the same companion flange for connection to a universal joint and propeller shaft.

One of the objects of the present invention is to provide, in conjunction with the transmission of a heavy duty type such as might be used on buses, trucks, and similar vehicles, an auxiliary transmission which provides two additional speed ratios and which can be attached to the conventional transmission without requiring any substantial modification or change therein or in the drive train of the vehicle.

Another object of the present invention is to provide a construction of this type having novel type of control means for selectively controlling the shift by which one or the other of the speed ratios in the auxiliary transmission can be selected.

Another object of the present invention is to provide a compact shift arrangement which can be controlled either pneumatically or hydraulically, and which provides for return of the shifting mechanism to neutral position automatically when the pressure is released in the shift control mechanism.

A still further advantage secured by the present invention is to enclose the shift control mechanism within the housing of the auxiliary transmission without substantially enlarging such housing and without increasing the axial length of the transmission so that the transmission is kept relatively short in length to provide for a propeller shaft of sufficient length.

Another feature of the present invention is the provision of an actuating mechanism for controlling the shift mechanism which comprises a fluid pressure operated system controlled by a clutch pedal or the like and including means for locking the mechanism in gear engaging position in the event of failure of the pressure system.

Other objects and advantages of the present construction will appear more fully from the following detailed description, which, taken in conjunction with the accompanying drawings will disclose to those skilled in the art the particular construction and operation of a preferred form of the present invention.

In the drawings:

Figure 1 is a sectional view through the auxiliary transmission of the present invention;

Figure 2 is a detail sectional view of the shift mechanism in neutral position;

Figure 3 is a corresponding view of the shift mechanism in one of its shifted positions;

Figure 5 is a diagrammatic sectional view of the pressure controlled shift mechanism and interlock incorporated in the shifting mechanism of Figures 2 and 3.

Figure 4:
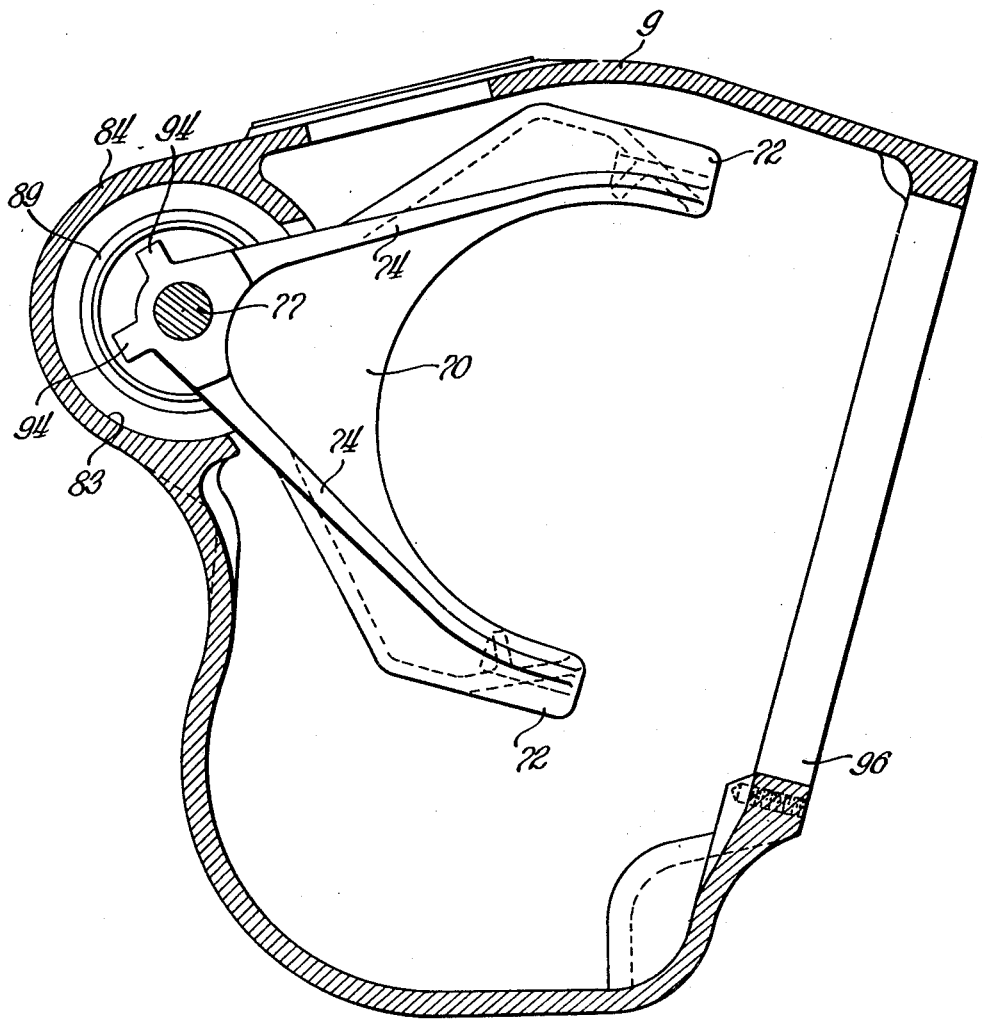
Figure 4 is a sectional transverse view through the auxiliary transmission housing showing the relative position of the shift control mechanism with respect to the shifter fork.

Referring now in detail to the drawings, there is provided a standard or conventional type transmission housing 5 having an output shaft 6 which, as is usual practice, projects beyond the end wall of the standard transmission and is provided with splined portions 8 on its projecting end and with a reduced threaded stud portion 7.

Secured to the conventional transmission housing 5 and supported thereon as a rigid unit is the auxiliary transmission housing 9, which is of generally box formation and is provided in its lower or bottom wall with the drain plug 10. The housing 9 is provided with a forward end wall 12 which is secured in any suitable manner to the end wall of the conventional transmission housing 5, and preferably there is provided an opening 13 therein within which is disposed a bearing cap 14, which cap contains the lock ring 15 for securing the outer race of the ball bearing assembly 16 that supports the output shaft 6 of the main transmission.

Mounted on the splined portion 8 of this output shaft is a gear member 17 which, at one end, bears against the thrust washer 18, locking the inner race of the bearing assembly 16 in position. The opposite end of the hub portion of gear 17 is held in position by the nut 19 threaded on the projecting stud 7 of the shaft 6.

The gear 17 is provided with external gear teeth 20 which are in constant meshing engagement with the teeth of a gear 22 splined upon the lay or countershaft 23 of the auxiliary transmission. The shaft 23 is journalled at its forward end in tapered bearings 24 secured in the end wall 12 of the housing 9, and at its opposite end is supported in tapered bearings 25 supported in the rear end wall 26 of the housing 9.

A second gear 27 is non-rotatably secured upon the shaft 23 and is held in spaced relation to the gear 22 by means of the sleeve or spacer member 28.

The gear 20 on the output shaft 6 is provided with an internal annular shoulder portion 29 which receives the outer race 30 of a roller bearing assembly, including the rolls 32 which are supported on the extended annular surface 33 of an enlarged portion 34 of the auxiliary transmission output shaft 35. The shaft portion 34 is recessed, as at 36, to receive the projecting hub portion of the gear 17 and end 7 of the shaft 6, and also is preferably provided with external splines 37 for receiving an axially slidable clutch member, generally indicated at 38, having axially spaced clutch gear portions 39 and 40. The gear 17 is provided with internal clutch portions 42 overhanging the portion 34 of the shaft 35 and adapted to receive the clutch teeth 39 of clutch member 38 when it is shifted to the left from the position shown in Figure 1.

Rotatably mounted upon the shaft 35, as by means of the needle rollers 43, is a gear member 44 having external gear teeth in constant meshing engagement with the gear teeth of gear 27 on countershaft 23. Gear 44 is also provided with internal clutch teeth 45 which are adapted to be engaged by the clutch teeth 40 of clutch member 38 when it is shifted to the right from the position shown in Figure 1. Each of the gears 17 and 44 is also provided with a tapered synchronizing surface 46 and 47, respectively, adapted to receive corresponding tapered frictional elements 48 and 49 of a synchronizer sleeve indicated generally at 50.

The clutch member 38 is provided at circumferentially spaced points with radially extending flange portions 52 which project through suitable openings 53 in the sleeve 50, and which carry an annular yoke ring 54 composed of three washers or discs, the intermediate one being recessed at spaced points to provide recesses for wire spring members 55. The rings 54 are secured to the extending portions 52 of the clutch member 38 by means of rivets 56, and this entire construction in general is similar to that disclosed in United States Letters Patent, No. 2,256,308, issued September 16, 1941, to Leo A. Bixby and Robert Lapsley, which, in general, provides a blocking type synchronizer for selectively clutching either the gear 17 or the gear 44 to the shaft 35.

The shaft 35 has a reduced portion 57 projecting axially out of the rear end wall 26 of the auxiliary transmission housing and journalled in the ball bearing assembly 58 secured in position by the bearing cap 59, which bearing cap in turn carries a lubricant seal member 60 seating about the hub portion of the companion flange 62 secured in splined engagement on the projecting portion 57 of shaft 35 and held in position by the nut 63.

It will thus be seen that when the shift mechanism is actuated to move the clutch member 38 to the left, as viewed in Fig. 1, the shaft 6 is directly coupled to the shaft 35 through the engagement of clutch teeth 39 and 42 from the gear 17. When the mechanism however, is shifted to the right, as viewed in Fig. 1, the gear 17 drives the gear 22, which in turn drives gear 44 through gear 27, and gear 44 is in turn clutched to the shaft 35 through engagement of clutch teeth 40 and 45.

In order to control and select the position and movement of the clutch member 38, I have disclosed in Figures 2, 3 and 4 a clutch shifting mechanism, including a shifter fork indicated generally at 70 having spaced arm portions 72, which in turn are provided with recesses 73 adapted to engage the opposite radial faces of the disc assembly 54. Preferably, the clutch fork is provided with strengthening ribs 74 for preventing deflection thereof, and is also provided with a hub portion 75 slidably mounted on the shift rail 76. The shift rail 76 is supported at its opposite ends in suitable socket portions 77 formed in flange portion 78 onto which are threaded the rings 79.

The sockets 77, flange portions 78 and rings 79 form part of sliding piston members 80, within the cylinders 83 formed integrally with the housing 9 in an offset portion 84 thereof. The ends of these cylinders are preferably closed by threaded cap members 85 which are provided centrally with tapped pipe openings 86 for receiving conduits or pipes conducting fluid under pressure to the ends of these cylinders.

The pistons 80 are preferably hollow, and are provided with internal annular surfaces 88 within which are slidably mounted cup members 89, these cup members being prevented from movement in one direction within the pistons 80 by means of the shoulders 90 formed integral with the pistons and being held against outer movement in the opposite direction by means of snap rings 92 carried adjacent the open ends of the pistons. Within the axial space between the shoulders 90 and the rings 92, the cup members 89 have axial sliding movement and are normally held in neutral position against the rings 92 by relatively heavy coil springs 93 disposed about the socket portions 77 of the pistons and biased at one end against the base of the cup members 89 and at the opposite end against the flange portions 78 of the socket portions 77 which are integral with the pistons 80. The hub portion 75 of the shift fork 70 is provided with extended ear portions 94, as indicated in Fig. 4, which bear against the flanged ends of the cap members 89. When fluid under pressure is introduced into either end of the shift control assembly, as for example through the port 86 in the right hand end of the cap member 85, this fluid acts against the piston 80 to move it to the left, as viewed in Fig. 3. This provides for initial compression of the spring member 93 in the right hand cylinder 80 and when this spring member is compressed to a point where it exerts sufficient force on the shifter fork 70, the fork is moved to the left, thereby moving the clutch member 38 of Fig. 1, together with the synchronizer sleeve 50, to the left. The blocking action of the synchronizer sleeve will first bring the shaft 35 and the gear 17 into synchronism, at which time the pressure built up within the cylinder 83 at the right hand side of the structure shown in Fig. 3 will force the clutch member 38 into position to engage clutch teeth 39 with clutch teeth 42. This in turn, of course, has effected corresponding compression of the left hand spring 93 within the left hand cylinder 80. When the pressure is released in the right hand cylinder 83, the spring action of the two springs 93 will force piston 80 back to the outer end of cylinder 83 and will return the shifter fork 70 back to its neutral position, thereby disengaging clutch teeth 39 and 42 to thereby return the auxiliary transmission to a neutral position.

A similar operation occurs when pressure is introduced into the left hand cap member 85 into the left hand cylinder 83 which moves the piston and its associated cup member 89 to the right, first moving the shifter fork 70 into position to produce blocking action in the synchronizer 50 and then building up sufficient pressure so that when synchronization is obtained, the shifter fork will move on to engage clutch teeth 40 with clutch teeth 45 of gear 44. Similarly, upon release of pressure in the left hand cylinder 83, the springs 93 will cooperate to return the shifter fork 70 to a neutral position.

Thus it will be apparent that with the shift control mechanism of the present invention, the synchronizer mechanism is adapted to operate for selectively providing either direct drive or a reduced speed drive through the auxiliary transmission, and upon release of the shifting pressure, will return the auxiliary transmission to a centering or neutral position without the use of detents or other mechanisms. Also, it is to be observed that with this construction the entire shifting mechanism is self-contained within the auxiliary transmission housing, and the only connections thereto are the fluid pressure connections to the end caps 85 of cylinders 80.

The auxiliary transmission housing 9 of Fig. 4, as disclosed is provided with an opening 96 in one side wall thereof, whereby the gears can be assembled into the housing 9 for mounting upon the various shafts therein. The opening 96 is adapted to be closed by any suitable cover plate.

Referring now to Fig. 5 which discloses the schematic of diagrammatic layout of a fluid pressure control system for providing the fluid pressure to actuate the respective pistons 80 in order to effect shifting of the auxiliary transmission, there is disclosed in Fig. 5 a shift lever fork 70' which is mounted between the two pistons 80 carried within cylinders 83. The shift fork 70' is secured to the shaft 76' by means of the set screw 100 to lock the fork for conjoint movement with the shaft. The auxiliary transmission housing 9' in this form of the invention is provided with an opening 101 within which is secured an interlock device indicated generally at 102. The shift fork 70' is also provided with an upwardly extending boss 103 substantially centrally thereof for a purpose to be described hereinafter.

There is provided in the vehicle, at any convenient location, an air pressure supply reservoir 104 which has a discharge conduit 105 provided with a branch line 106 leading to a selector control valve indicated generally at 107 and a second branch line 108 which leads through the connection 109 to the interlock mechanism 102.

The selector control valve 107 is provided with a T connection 110 and the branch line 106 is continued through this T and the line 112 to a clutch valve indicated generally at 113.

From the clutch control valve 113 there is provided a pressure line 114 having a connection to the lower portion of the selector valve 107 through the branch lines 115 and 116.

With the mechanism in the position shown in Fig. 5 it will be apparent that there is air under pressure imposed upon the valve members 117 and 118 in the selector control valve through the T connectiion 110 and the chamber 119 into which the head ends of these valves extend. This maintains these valves closed at this time.

Similarly there is pressure imposed through the line 112 into the chamber 120 of the clutch valve 113 which, because of the open position of the valve member 122, provides for transmission of this pressure through the line 114 and its branch connections 115 and 116 against the head ends of pistons 123 and 124 carried in the cylinders 125 and 126 provided at the lower end of the selector valve 107. The pistons 123 and 124 are provided at their inner ends with plunger portions 127 which engage in the valve stems 128 and 129 of the valves 117 and 118 respectively, locking these valve stems in position against movement. Thus the valves 117 and 118 remain closed and no pressure is transmitted past these valves into the lines 130 leading to the left hand cylinder 83 of the shift mechanism or through line 132 leading to the right hand cylinder 83 of the shift control mechanism. The device is now in neutral position.

When it is desired to shift the auxiliary transmission, the clutch pedal of the vehicle is depressed. This provides for rotation of the cam member 133 causing the flatted portion 134 thereof to be rotated into a position in alinement with the valve stem 135 of the clutch valve 113. This allows lowering of the valve stem 135 which in turn causes closing of the valve 122 at the upper end thereof by engaging upon the valve seat 136 and causes the valve stem 135 to be moved downwardly under the influence of the spring 137 thereby opening the valve at the lower end thereof with respect to the seat 138. This causes the pressure in lines 116 and 115 to be discharged through line 114, past the lower end of valve 122 and through the passageway 139 of the valve stem 135 and outwardly through the exhaust opening 140 of the clutch valve.

The reduction in pressure and exhaust of air from lines 115 and 116 in turn causes the pistons 123 and 124 to move outwardly out of interlocking engagement with valve stems 128 and 129 of the selector valve due to the springs which engage these pistons as shown in Fig. 5.

There is a selector control shaft 142 which is rotatably mounted at a point adjacent the operator, such as upon the steering post or the like, and which carries a flat cam member 143 so arranged that upon rotation in alternate directions, the cam member 143 may selectively effect raising of either of the valve stems 128 or 129. Assuming for example, that the operator desires to shift the shift fork 70' to the left as viewed in Fig. 5, the cam member 143 will be rotated by the shaft 142 in such direction as to effect raising of the valve stem 129. This produces, due to the engagement of the lower end of valve 118 indicated at 144 engaging the upper end of the valve stem, opening of the valve 118 from its upper seat thereby allowing air pressure from chamber 119 to flow past valve seat 145 of the selector valve and thence into line 132 and sent into the end of the right hand cylinder 83 forcing the piston 80 to the left and consequently, through the action of springs 93, as previously explained, forcing shifter fork 70' to the left into gear engagement. At the same time it will be noted that the left hand cylinder 83 is opened to exhaust through the line 130 which opens into the chamber disposed below the upper end of valve 117 and its associated valve seat 146 and thence downwardly through the passageway 147 of valve stem 128, and outwardly through the exhaust chamber 148 formed in the selector body. As a result, the shifter fork 70' is moved to the left and when the clutch pedal is re-engaged, pressure is re-established on pistons 123 and 124 returning them into locking engagement to maintain the shifted position.

Similarly if it is desired to move the shift fork 70' to the right, the clutch pedal, being first disengaged, removes pressure from lines 115 and 116 through exhaust port 140 in the clutch valve 113, and consequently releases pistons 123 and 124 from engagement with their respective valve stems. As a result, rotation of control shaft 142 causes the cam member 143 to raise valve stem 128 thereby unseating valve 117 and allowing pressure from chamber 119 to pass through conduit 130 into the left hand cylinder 83, thereby producing shifting of the fork 70' to the right due to the fact that the right hand cylinder 83 is open to exhaust through line 132 past the lower end 144 of valve 118 and thence outwardly through the valve stem to the exhaust chamber 148. Upon return of the clutch pedal of the vehicle to engaged position, cam 133 rotates to a position re-establishing pressure through line 114 upon the pistons 123 and 124 thereby locking valve stem 128 in its raised position and relocking valve stem 129 in its lowered position which retains line 132 open to the exhaust chamber 148.

It is thus apparent from the foregoing description of the operation of this control mechanism that disengagement of clutch pedal and actuation of control shaft 142 in opposite directions selectively controls the pressure shifting of the shift fork 70' in either direction.

Considering now the interlocked mechanism 102, it will be apparent that this mechanism is such that under normal operation of the system, full air pressure from reservoir 104 is imposed upon chamber 149 in the interlocked valve 102 and consequently, is imposed through chamber 150 upon the lower side of the sliding piston member 152.

This piston member 152 is normally biased in a downward direction by the spring 153 held in position by the cap member 154 and engaging the opposite or upper side of the piston.

The lower end of the piston 152 is provided with a sealing ring 155 and with an interlocked boss 156. The interlocked boss 156 is normally retained by the pressure in chambers 149 and 150 in a position out of engagement with the boss or stud 103 on the shifter fork so that the shifter fork is free to move either to the right or the left without any interference from the interlocked boss 156. However, if there should be a failure or a decrease in the air pressure in reservoir 104 which would prevent normal operation of the shifting mechanism while it is in engaged position, the reduction in pressure in chamber 150 would allow spring 153 to operate moving the interlocked boss 156 downwardly into the path of the boss 103 on the shifter fork and thereby locking the shifter fork either in its right hand or left hand shifted position, thereby maintaining one or the other of the gear ratios in the auxiliary transmission in engaged position so that the operator of the vehicle can drive the vehicle even with a failure of the pressure control system. Thus with any failure of the pressure shifting mechanism during the time that the vehicle is in operation, the interlocked mechanism 102 will automatically lock the shifter fork in whichever of its engaged positions it happens to be in so that the operator of the vehicle can continue to proceed within a gear drive and does not have to be towed which would be the case if the pressure in the control system was lost, since under these conditions the springs 93 would have a tendency to return the shift fork 70' to a neutral position. The control system shown in Fig. 5 has the advantage of providing the proper sequence of operations, that is, release of the clutch pedal which must be provided before any gear shifting can be effected in order to relieve the transmission and auxiliary transmission of motor torque. This disengagement of the clutch pedal automatically provides for setting the selector valve 107 in position so that the control shaft can select which of the two ratios in the auxiliary transmission may be engaged by actuation through the air pressure system, thus relieving the operator of any manual shifting. Furthermore, upon re-engagement of the clutch, the cam 133 on the clutch pedal shaft automatically re-establishes the pressure system to maintain the selector valve stem 128 or 129 in its actuated position to assure that the mechanism will remain in its shifted position by positively opening one of the control mechanisms to pressure and opening the other of the control mechanisms to exhaust. Furthermore, it is apparent that with the interlock provision through the pressure line 108 and the interlock control 102, there is means for maintaining the mechanism in gear shifted position in case of failure of the pressure control. Consequently, the control system of Fig. 5 provides for proper sequence of gear shifting and for maintenance of gear engagement in the event of failure of the control system.

It is therefore believed that I have provided a simple, compact auxiliary transmission and control which may be readily assembled to a conventional type transmission, and which embodies a self-contained actuating mechanism for the synchronizer by which the auxiliary transmission is clutched to the main output shaft of the conventional transmission.

I am aware that various changes may be made in certain details of the present construction, and I therefore do not intend to be limited except as defined by the scope and spirit of the appended claims.

I claim:

1. Control means for a shifter fork adapted to be shifted from a neutral position to a gear engaging position comprising piston means for shifting said shifter fork to its gear engaging position, a fluid pressure system including selector valve means for selectively connecting said piston means with a source of fluid under pressure to actuate said piston means, lock-out means biased in a direction to engage said fork in its gear engaging position to prevent return of the latter to its neutral position, and means in constant communication with said source of fluid under pressure for normally rendering said lock-out means inoperative above a predetermined pressure of said source of fluid under pressure.

2. Control means for a shifter fork adapted to be shifted from a neutral position to a gear engaging position comprising, piston means for shifting said fork to its gear engaging position, a fluid pressure system including selector valve means for connecting said piston means with a source of fluid under pressure to actuate said piston means, and lock-out means comprising a spring loaded member biased in a direction to engage said fork in its gear engaging position to prevent return of the latter to its neutral position, and means in constant communication with said source of fluid under pressure for rendering said spring loaded member inoperative above a predetermined pressure of said source of fluid under pressure.

3. Control means for a shifter fork adapted to be selectively shifted in opposite directions from a neutral position to gear engaging positions comprising, piston means for shifting said fork to its gear engaging positions, a fluid pressure system comprising selector valve means for selectively connecting said piston means with a source of fluid under pressure for shifting said fork to one or the other of its gear engaging positions, chute valve means between said source of fluid under pressure and said selector valve means for conditioning the latter for operation, and lock-out means comprising a member having an operative position for engaging said fork to prevent movement of the latter from either of its gear engaging positions to neutral position, and an inoperative position away from said fork, means for biasing said member toward its operative position, and means in constant communication with said source of fluid under pressure for rendering said last-named means inoperative above a predetermined pressure of said source of fluid under pressure.

F. MARION HOGUE.

REFERENCES CITED

The following references are of record in the file of this patent:

UNITED STATES PATENTS

| Number | Name | Date |
| --- | --- | --- |
| 1,010,054 | Irish | Nov. 28, 1911 |
| 1,141,589 | Taylor | June 1, 1915 |
| 1,365,112 | Line | Jan. 11, 1921 |
| 1,733,502 | Linsley | Oct. 29, 1929 |
| 1,950,860 | Nathan | Mar. 13, 1934 |
| 2,012,082 | Hieber et al. | Aug. 20, 1935 |
| 2,120,104 | Livermore | June 7, 1938 |
| 2,159,846 | Gambordella | May 23, 1939 |
| 2,167,790 | Whitehead | Aug. 1, 1939 |
| 2,180,154 | Lenz | Nov. 14, 1939 |
| 2,226,660 | Eaton | Dec. 31, 1940 |
| 2,233,790 | Linsley | Mar. 4, 1941 |
| 2,356,598 | Lang | Aug. 22, 1944 |
| 2,357,952 | Hoelscher | Sept. 12, 1944 |
| 2,399,567 | Peterson | Apr. 30, 1946 |

FOREIGN PATENTS

| Number | Country | Date |
| --- | --- | --- |
| 395,612 | Germany | May 10, 1924 |
| 670,844 | Germany | Jan. 27, 1939 |
| 706,442 | Germany | May 27, 1941 |